United States Patent [19]

Noé

[11] 4,236,626
[45] Dec. 2, 1980

[54] WALKING BEAM CONVEYOR

[75] Inventor: Oskar Noé, Mülheim an der Ruhr, Fed. Rep. of Germany

[73] Assignee: BWG Bergwerk- und Walzwerk-Maschinenbau GmbH, Duisburg, Fed. Rep. of Germany

[21] Appl. No.: 7,608

[22] Filed: Jan. 29, 1979

[30] Foreign Application Priority Data

Mar. 8, 1978 [DE] Fed. Rep. of Germany ....... 2809955

[51] Int. Cl.$^3$ ............................................. B65G 25/00
[52] U.S. Cl. .................................. 198/488; 198/774; 242/79
[58] Field of Search ............... 198/459, 485, 487, 488, 198/774, 574; 414/589, 750, 745, 910, 911; 242/79

[56] References Cited

U.S. PATENT DOCUMENTS 3,970,008  7/1976  Borsuk et al. ......................... 198/459

FOREIGN PATENT DOCUMENTS 2534958  2/1977  Fed. Rep. of Germany ........... 198/774
46-17668  5/1971  Japan ....................................... 198/774

Primary Examiner—Joseph E. Valenza
Attorney, Agent, or Firm—Karl F. Ross

[57] ABSTRACT

A walking-beam conveyor has a horizontally extending movable beam flanked by a pair of horizontally extending fixed beams. This movable beam is subdivided into a relatively long main portion and a relatively short end portion. The entire movable beam can be reciprocated through a relatively short vertical stroke and horizontally through a horizontal stroke for stepwise displacement of a load supported on the beams. In addition the end portion can be vertically displaced through a relatively long vertical stroke for picking a load, as for instance a sheet-metal coil, up off a machine, as for instance a winding machine, and for similarly lifting up a load to be discharged onto a higher location.

5 Claims, 5 Drawing Figures

WALKING BEAM CONVEYOR

FIELD OF THE INVENTION

The present invention relates to a walking-beam conveyor. More particularly this invention concerns such a conveyor of the type used to transport coils of sheet metal or the like.

BACKGROUND OF THE INVENTION

A walking-beam conveyor, such as described in my copending patent application Ser. No. 868,339, filed Jan. 10, 1978, has at least one horizontally extending fixed beam and at least one horizontally extending movable beam parallel to the fixed beam. The movable beam can be stroked horizontally and vertically in a raise-advance/ /lower-return sequence of motions. Thus an object to be transported that is standing on the beams is lifted by the movable beam, advanced a step horizontally, and redeposited on the fixed beams. Typically a single movable beam is provided between a pair of fixed beams for safest supporting of the object beam transported. Such a conveyor can normally transport much heavier loads than a belt-type conveyor, and is particularly useful in a rolling mill or the like where the objects to be transported are not only extremely heavy, but relatively durable.

Thus it is standard practice in a rolling mill to provide such a walking-beam conveyor between adjacent treatment stations, as for instance extending from the winding station at the downstream end of one treatment path and to an unwinding station at the upstream end of another treatment path. Such winding and unwinding stations normally have horizontally extending spindles that must be fitted through the coil.

It is standard practice to use a separate conveyor carriage for displacing the coils at each end of the walking-beam conveyor from the winding or unwinding spindle on to the end of the conveyor. Even when the winding or unwinding spindle is provided directly at one end of the conveyor, it is normally necessary to provide a special mechanism for lifting the coil off or onto the spindle from the conveyor end, as obviously the spindle must be spaced a distance above the upper surface of the conveyor which is at least equal to the radius of the largest coil likely to be handled.

As the coils of sheet metal in a rolling mill are frequently of a diameter as great as 1.0 m–2.5 m, it is therefore necessary that the handling equipment for moving the coils from a windup or unwind spindle to the end of the conveyor be relatively large. This device is normally constituted as a self-powered vehicle which must be heavy-duty enough both to transport the coil horizontally through a predetermined distance, and to lift it vertically between the relatively high position of the spindle it is to be mounted on or removed from, and the relatively low position of the conveyor support surface. As the vertical stroke of the movable beam of the conveyor is only between 150 m and 200 m, even if the coil is picked off or set on to the conveyor when it is in its uppermost condition, it is still necessary to vertically displace the coil through some distance to move from the spindle to the conveyor or from the conveyor to the spindle. Consequently this relatively heavy-duty machine is expensive and adds appreciably to production costs of such a rolling mill. cl OBJECTS OF THE INVENTION It is therefore an object of the present invention to provide an improved walking-beam conveyor.

Another object is the provision of such a conveyor which overcomes the disadvantages of the above-described prior-art system.

SUMMARY OF THE INVENTION

These objects are attained according to the instant invention by forming the movable beam of a walking-beam conveyor as a main portion and at least one end portion. This end portion can be displaced vertically independently of the main portion through a distance which is considerably greater than the vertical stroke of the main portion. Thus the upper side of the end portion can be moved from a lower position level and aligned with the upper side of the main portion and an upper position considerably above the upper side of this main portion. This expedient allows the walking-beam conveyor itself to pick a coil off a spindle or place one thereon, completely eliminating the need of a separate piece of equipment for this task.

According to this invention a coil to be loaded, for instance, from the conveyor onto a spindle is displaced along the conveyor until it rests completely on the end portion thereof. This end portion is thereupon lifted up until the hole through the annular coil is aligned with the spindle, then the movable beam of the conveyor is stroked horizontally toward the spindle so as to fit the coil over this spindle. The movable beam of the conveyor can thereupon drop down, leaving the coil on the unwinding spindle. To remove a coil from a windup spindle, the end portion of the conveyor is displaced horizontally to a position directly underneath the coil, then the end portion is raised up until it supports the coil itself. The entire conveyor is then stroked horizontally back away from the spindle, thereby pulling the coil off. Thereafter the end portion can drop down to the level of the main portion and the bundle or coil can be transported horizontally away in the manner well known in the art. Making the end portion movable independently of the main portion in a vertical direction makes it possible to horizontally stroke the movable beam with its main portion in its lowermost position and its end portion carrying a coil to be picked up or dropped off, so that during this loading or unloading the other coils on the walking-beam conveyor will not be displaced horizontally.

It is also within the scope of this invention to make the movable end portion displaceable horizontally independently of the main portion. This provision allows a coil to be maneuverable vertically and horizontally by the end portion independently of displacement of the main portion, so that accurate positioning of the coil is possible. Of course in all embodiments the end portion is dropped down level with and pulled horizontally next to the main portion once a coil is picked up so that the coil can be transported horizontally away in the normal manner by a synchronous horizontal and vertical stroking of the portions. Similarly the main portion is held level with and horizontally immediately next to the main portion when a bundle is being transported horizontally along the conveyor to the main portion for eventual lifting and fitting over an unwinding spindle.

The walking-beam conveyor equipped with a movable end portion as described above can be of the type described in my above-cited copending application, that is having a main transporting beam which can be made up of a succession of beam units and which is carried by a plurality of support heads located at fixed points along the path of the beam. This conveyor comprises drive units attached to the main beam of the individual sections thereof, with each drive unit including a rack and pinion powered by a motor with a transmission. The drive unit can be raised and lowered with the beam. The rack is provided on the beam while the pinion is connected to a respective support head which can also carry the motor and the transmission.

The vertical displacement can be carried out by means of simple pneumatic or hydraulic cylinders, which may also be used if desired for the horizontal stroking of the movable beam. A single pump can operate all of these cylinders, including the cylinder or cylinders for independent vertical and if necessary horizontal displacement of the end beam portion. As cylinders for the end beam portion normally need not be operated at the same time as the other cylinders, the pump need not be overdimensioned to take up any extra load.

SPECIFIC DESCRIPTION

Figure 1:
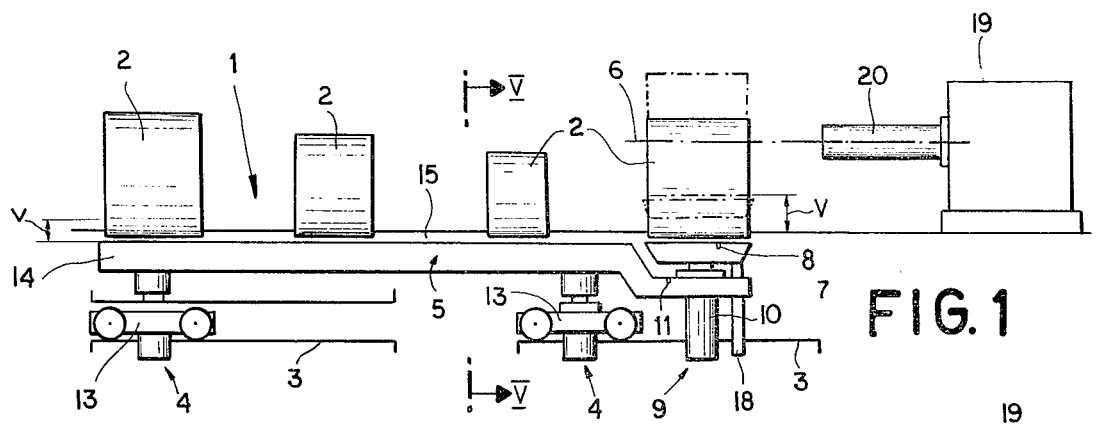
FIGS. 1 and 2 are side and top largely schematic views of the system according to this invention.

As shown in FIGS. 1-5 a walking-beam conveyor 1 serves for horizontally transporting objects, here sheet-metal coils 2, relative to a fixed support or base 3. This conveyor 1 has lifters 4 serving to vertically stroke a movable beam 5 through a vertical displacement v relative to and between a pair of lateral fixed beams 15. The upper surface of the movable beam 5 is formed as a shallow trough so that the coils 2 can be supported with their axes parallel to the direction of displacement. It would also, of course, be possible to transport the coils with their axes vertical, or horizontal and transverse to the direction of displacement.

The conveyor 1 terminates at one end adjacent a winding or unwinding machine 19 having a spindle 20 defining an axis 6 that is horizontal and parallel to the direction of displacement along the conveyor 1, but spaced considerable above it. A coil 2 can be moved vertically through a stroke V between a lower position shown in solid lines in FIG. 1 to an upper position shown in dot-dash lines in FIG. 1 with its axis or central hole aligned with the spindle 20 by means of a lifting arrangement 7 provided at one end of the conveyor 1. The movable beam 5 is therefore divided into a relatively long portion 14 and a relatively short end portion 8 which can be moved vertically independently of each other. The lifting arrangement 7 is vertically displaced by a hydraulic ram 9 centered on a vertical axis 10 and having a piston rod connected to the end portion 8 and a cylinder connected to an end extension 11 of the beam 5. This end extension 11 reaches underneath the end portion 8, forming a downward step of the main portion 14.

Figure 2:
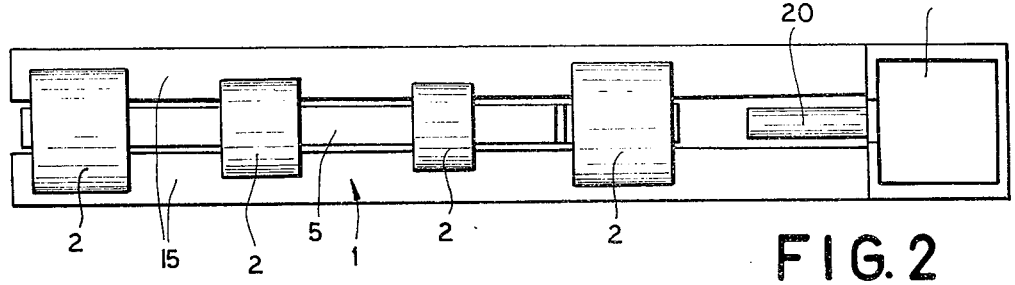
Figure 5:
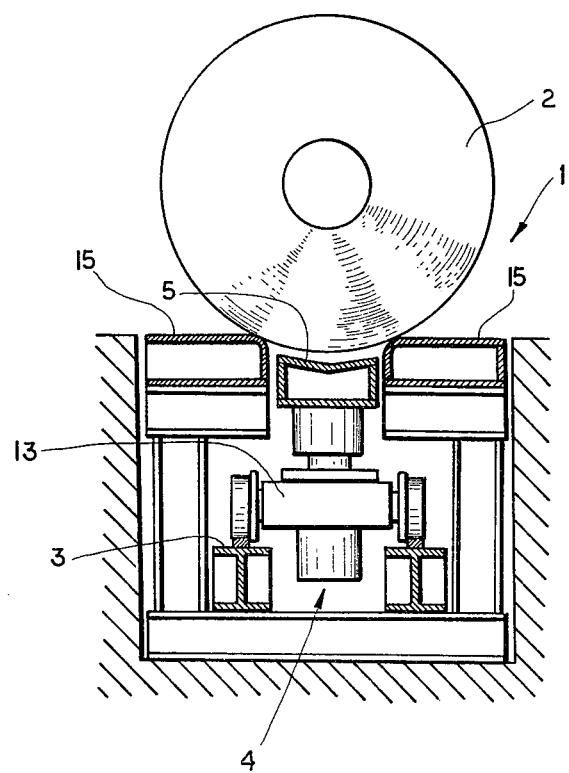
FIG. 5 is a section taken along line V—V of FIG. 1.

The entire beam 5 may roll on the supports 3 by means of carriages 13, so that in the arrangements of FIGS. 1, 2, and 5 the main portion 14 and end portion 8 must move horizontally jointly, but the end portion 8 can move vertically independently of the main portion 14. A bar 18 extending downwardly from the end portion 8 passes through a complementarily shaped hole in the end extension 11 and prevents twisting of the end portion 8 relative to the main portion 14.

Figure 3:
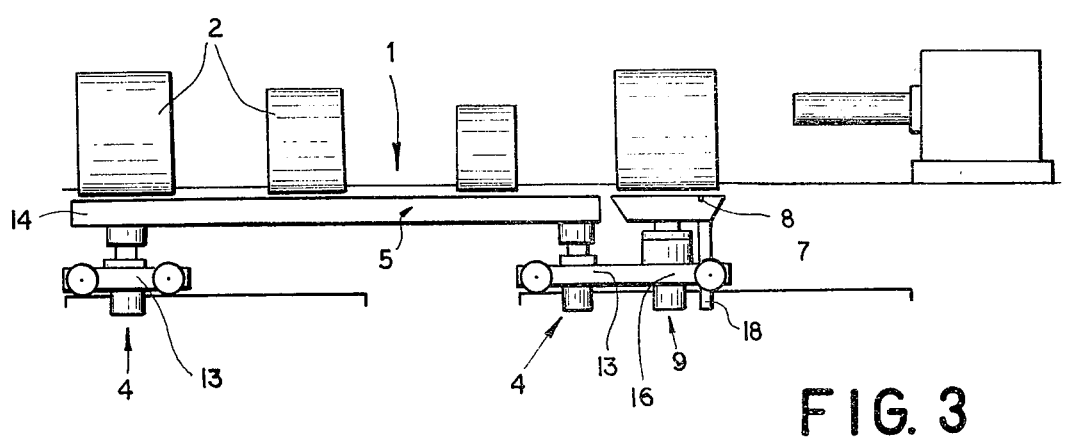
FIGS. 3 and 4 are side views showing other arrangements according to this invention.

It is possible as shown in FIG. 3 to dispense with the end extension 11 and mount the ram 9 on a portion 16 of the one carriage 3.

Figure 4:
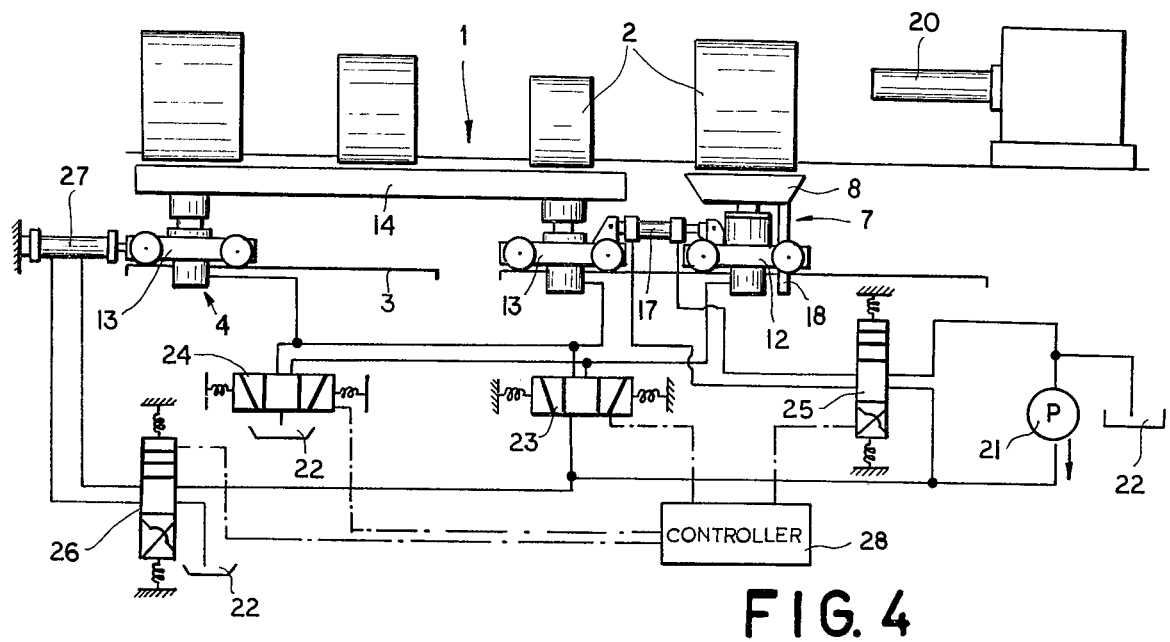

It is also possible as shown in FIG. 4 to mount the end portion 8 on a separate carriage 12 connected via a double-acting hydraulic cylinder 17 to the adjacent carriage 13. Thus the portions 8 and 14 are horizontally independently displaceable relative to each other.

FIG. 4 further shows how a heavy-duty hydraulic pump 21 has a high pressure side connected to valves 23, 24, 25, and 26 and a low-pressure side connected to a sump or reservoir 22. The valve 23 is a three-port three-position slide valve connected between the high-pressure side of the pump 21 and the hydraulic cylinders of the lifters 4 and 9. In one end position the valve 23 pressurizes the lifters 4 and in the opposite end position it pressurizes the lifter 9. Valve 24 is similarly constructed but is connected to the sump 22 so that in one end position it depressurizes the cylinders 4 and in the opposite end position it depressurizes the cylinder 9. The three-position reversing valve 25 is connected to the double-acting cylinder 17 for displacing the carriage 12 in either direction independently of the carriage 13, and another such three-position or reversing valve 26 is connected to a double-acting hydraulic cylinder 27 that serves for the horizontal stroking of the beam 5. A controller 28 is connected to all of these valves 23–26 for synchronous operation, normally as determined by an operator at a control station.

The operation of this system is described below with respect to the embodiment of FIG. 4, as this embodiment is the most complicated and from its operation the functioning of the other embodiments can easily be inferred.

Assuming the spindle 20 carries a bundle 2 that is to be transported horizontally away to the left as seen in FIG. 4 the operator first moves the entire beam 5 to the extreme right-end position. Then the valve 25 is actuated to expand the cylinder 17 and move the end portion 8 directly under the spindle 20. The valve 23 is then operated to pressurize the ram 9 and lift the end portion 8 up until it engages underneath and slightly lifts the coil 2 on the spindle 20. Operation of the valve 25 then contracts the cylinder 17 to pull this coil off the spindle 20, whereupon the valve 24 is actuated to depressurize the ram 9 and drop the end portion 8 down level with the main portion 14, thereby depositing the just picked up coil 2 onto the side fixed beams 15. The valve 26 is then operated to displace the main portion 14 horizontally underneath the just picked up coil 2, then the valve 23 pressurizes the cylinders 4 to raise this main portion 14 up and step it along the manner well known in the art.

The reverse process is used for lifting a coil 2 from the conveyor 1 and positioning it on a spindle 20. Similarly appropriate valves can be provided for synchronous vertical displacement of the portions 8 and 14.

The above-described sequence of operations would, of course, be different if a rack-and-pinion arrangement such as described in my above-cited copending application were employed for the horizontal displacement of the movable beam 5.

I claim:

1. A walking-beam conveyor for conveying objects such as sheet-metal coils, said conveyor comprising:

a pair of generally parallel horizontally extending and generally fixed beams;

at least one horizontally extending movable beam generally parallel to and between said fixed beams and having a main portion and an end portion having respective upper sides;

a horizontally extending support underneath said portions;

a main carriage supporting said main portion on said support for horizontal displacement thereon;

an end carriage independent of said main carriage and supporting said end portion for horizontal displacement on said support;

means for horizontally reciprocating said portions of said movable beam jointly through respective predetermined horizontal strokes;

means for vertically reciprocating said main portion;

means operatively engaged horizontally between said end carriage and said main carriage for horizontally displacing said end portion independently of and relative to said main portion; and means for vertically displacing said end portion independently of and relative to said main portion through a predetermined vertical distance substantially greater than said vertical stroke.

2. The conveyor defined in claim 1 wherein said end portion is displaceable by said means for displacing between an upper position with its said upper side substantially above the upper side of said main portion and a lower position with said upper sides horizontally aligned.

3. The conveyor defined in claim 1 wherein said means for horizontally displacing includes a fluid-operated cylinder.

4. The conveyor defined in claim 3 wherein said cylinder is operatively engaged between said portions.

5. The conveyor defined in claim 1 wherein said means for displacing and said means for reciprocating include respective separate fluid-operated motors, said conveyor further comprising pump means for operating said motors and valve means for alternately connecting said pump means to said motors, whereby said pump means only operates one of said motors at a time.

* * * * *